United States Patent
Wang et al.

(10) Patent No.: US 10,713,471 B2
(45) Date of Patent: Jul. 14, 2020

(54) SYSTEM AND METHOD FOR SIMULATING FACIAL EXPRESSION OF VIRTUAL FACIAL MODEL

(71) Applicant: Institute For Information Industry, Taipei (TW)

(72) Inventors: Rong-Sheng Wang, Taipei (TW); Wan-Chi Ho, Taipei (TW); Hsiao-Chen Chang, Taipei (TW)

(73) Assignee: Institute For Information Industry, Taipei (TW)

( * ) Notice: Subject to any disclaimer, the term of this patent is extended or adjusted under 35 U.S.C. 154(b) by 121 days.

(21) Appl. No.: 16/197,346

(22) Filed: Nov. 20, 2018

(65) Prior Publication Data

US 2020/0110925 A1 Apr. 9, 2020

(30) Foreign Application Priority Data

Oct. 8, 2018 (TW) .............................. 107135393 A

(51) Int. Cl.
| | |
|---|---|
| *G06K 9/00* | (2006.01) |
| *G10L 25/63* | (2013.01) |
| *G06T 19/00* | (2011.01) |
| *G06T 19/20* | (2011.01) |

(52) U.S. Cl.
CPC ........ *G06K 9/00248* (2013.01); *G06T 19/006* (2013.01); *G06T 19/20* (2013.01); *G10L 25/63* (2013.01)

(58) Field of Classification Search
CPC ... G06K 9/00248; G06T 19/006; G06T 19/20; G10L 25/63

USPC ............................................................ 382/118
See application file for complete search history.

(56) References Cited

U.S. PATENT DOCUMENTS

| | | | |
|---|---|---|---|
| 9,020,822 B2 * | 4/2015 | Kalinli-Akbacak | .... G10L 15/00 704/270 |
| 9,082,400 B2 * | 7/2015 | Rezvani | ............ H04M 1/72552 |
| 10,176,619 B2 * | 1/2019 | Jiao | .......................... G06T 7/246 |
| 2017/0091535 A1 | 3/2017 | Yu et al. | |
| 2017/0168568 A1 | 6/2017 | Petrov | |
| 2017/0205886 A1 | 7/2017 | Wan et al. | |
| 2017/0231490 A1 | 8/2017 | Toth et al. | |

\* cited by examiner

*Primary Examiner* — Jonathan S Lee
(74) *Attorney, Agent, or Firm* — Skaar Ulbrich Macari, P.A.

(57) ABSTRACT

A system and method for simulating facial expression of a virtual facial model are provided. The system stores a plurality of three-dimensional facial models corresponding to a plurality of preset sentiments one-to-one. The system identifies a present sentiment according to an acoustic signal and selects a selected model from the three-dimensional facial models according to the present sentiment, wherein the preset sentiment corresponding to the selected model is same as the present sentiment. The system predicts an upper half face image according to a lower half face image, combines the lower half face image and the upper half face image to form a whole face image, and generates a plurality of feature relationships by matching the facial features of the whole face image with the facial features of the selected model so that a virtual facial model can simulate an expression based on the feature relationships.

20 Claims, 5 Drawing Sheets

SYSTEM AND METHOD FOR SIMULATING FACIAL EXPRESSION OF VIRTUAL FACIAL MODEL

PRIORITY

This application claims priority to Taiwan Patent Application No. 107135393 filed on Oct. 8, 2018, which is hereby incorporated by reference in its entirety.

FIELD

The present invention relates to a system and method for simulating facial expression of a virtual facial model. More particularly, the present invention relates to a system and method for simulating facial expression of a virtual facial model whose identification task is achieved according to image prediction and audio signals.

BACKGROUND

In the applications of Virtual Reality (VR) technology, it is an important issue to impart simulated facial expression changes to a virtual model (e.g. an avatar) in order to improve the interactive experiences in the virtual reality environment for users. According to some conventional technologies, the real-time facial expression of a user is identified based on images, which is then used to simulate facial expression of the virtual model. This kind of conventional technologies results in low identification accuracies and bad simulation results because the head-mounted display (HMD) worn by the user (which is required in the application of Virtual Reality) covers the upper half face of the user.

To overcome the problem that the upper half face is covered, some conventional technologies have a plurality of sensors (e.g., three-dimensional sensors, infrared sensors, electromyogram (EMG) sensors, electrooculogram (EOG) sensors, or the like) disposed in a head-mounted display. The sensors detect information such as muscle changes of the covered upper half face and then the facial expression of the upper half face can be simulated according to the changes of the muscle status. However, having a large amount of sensors disposed in a head-mounted display increases hardware cost. In addition, the upper half facial expression simulated according to the data of the sensors may conflict with or cannot be integrated with the lower half facial expression simulated according to the real-time face image.

Accordingly, imparting simulated facial expression to a virtual model vividly in virtual reality is still a tough task to be conquered.

SUMMARY

Provided is a system for simulating facial expression of a virtual facial model. The system comprises a storage and a processor, wherein the processor is electrically connected to the storage. The storage is configured to store a plurality of three-dimensional facial models corresponding to a plurality of preset sentiments one-to-one. The processor is configured to identify a present sentiment according to an acoustic signal and select a selected model from the three-dimensional facial models according to the present sentiment, wherein the preset sentiment corresponding to the selected model is the same as the present sentiment. The processor predicts an upper half face image according to a lower half face image, combines the lower half face image and the upper half face image to form a whole face image, and generates a plurality of feature relationships by matching a plurality of facial features of the whole face image with a plurality of facial features of the selected model so that the virtual facial model is adjusted for simulating facial expression according to the feature relationships.

Also provided is a method for simulating facial expression of a virtual facial model. The method is for use in an electronic computing device. The electronic computing device stores a plurality of three-dimensional facial models corresponding to a plurality of preset sentiments one-to-one. The method comprises the following steps of: (a) identifying a present sentiment according to an acoustic signal, (b) selecting a selected model from the three-dimensional facial models according to the present sentiment, wherein the preset sentiment corresponding to the selected model is the same as the present sentiment, (c) predicting an upper half face image according to a lower half face image, (d) combining the lower half face image and the upper half face image to form a whole face image, and (e) generating a plurality of feature relationships by matching a plurality of facial features of the whole face image with a plurality of facial features of the selected model so that the virtual facial model is adjusted for simulating facial expression according to the feature relationships.

The facial expression simulation technology (including a system and method for simulating facial expression of a virtual facial model) identifies a present sentiment according to a sound made by the user and then selects a selected model from the three-dimensional facial models according to the present sentiment. In this way, the facial expression of the selected model is consistent with the present sentiment of the user. The facial expression simulation technology provided by the present invention further predicts an upper half face image according to a present lower half face image of the user and combines the lower half face image and the upper half face image to form a present whole face image of the user. The present whole face image presents more instant, specific, and fine expression changes. Therefore, the virtual facial model can simulate the facial expression of the user more accurately by finding out feature relationships between a plurality of facial features of the whole face image and a plurality of facial features of the selected model and then changing the virtual facial model corresponding to the user accordingly. Consequently, the present invention can make a virtual facial model simulate facial expression vividly without equipping additional sensors when a part of user face is covered by the head-mounted display.

The detailed technology and preferred embodiments implemented for the subject invention are described in the following paragraphs accompanying the appended drawings for people skilled in this field to well appreciate the features of the claimed invention.

DETAILED DESCRIPTION

In the following description, a system and method for simulating facial expression of a virtual facial model will be explained with reference to certain example embodiments thereof. However, these example embodiments are not intended to limit the present invention to any specific examples, embodiments, environment, applications, or implementations described in these example embodiments. Therefore, description of these example embodiments is only for purpose of illustration rather than to limit the scope of the present invention.

It shall be appreciated that, in the following embodiments and the attached drawings, elements unrelated to the present invention are omitted from depiction, and dimensions of and dimensional relationships among individual elements in the attached drawings are provided only for ease of depiction and illustration, but not to limit the scope of the present invention.

Figure 1:
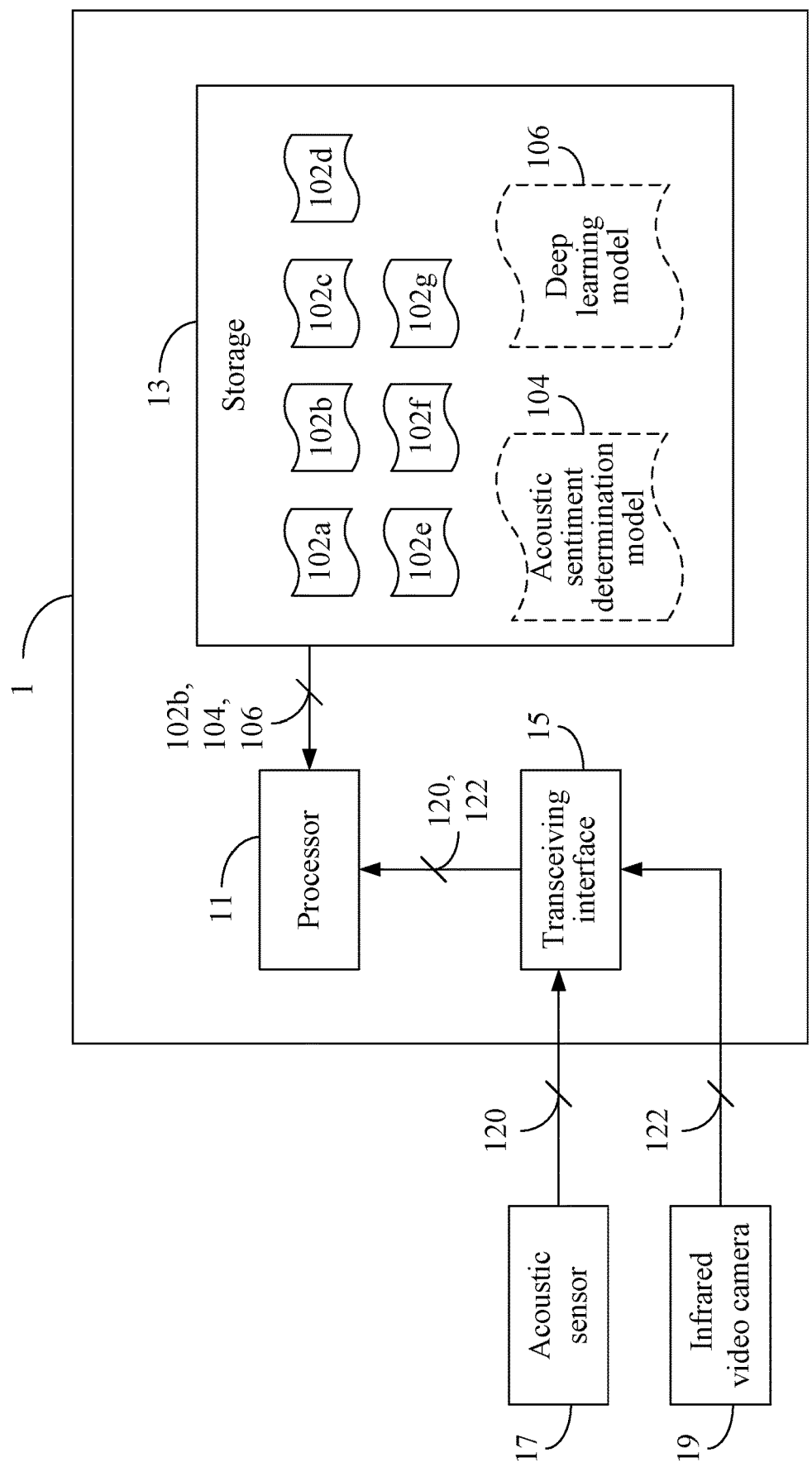
FIG. 1 is a schematic view depicting a system for simulating facial expression of a virtual facial model according to a first embodiment of the present invention.

A first embodiment of the present invention is a system for simulating facial expression of a virtual facial model (hereinafter referred to as "facial expression simulation system") 1, whose schematic view is depicted in FIG. 1. The facial expression simulation system 1 comprises a processor 11 and a storage 13, wherein the processor 11 is electrically connected to the storage 13. The storage 13 may be a hard disk drive (HDD) (e.g., a mobile hard disk, a cloud hard disk), a universal serial bus (USB), a compact disk (CD), or any other non-transitory storing medium or device having the same function and known by those of ordinary skill in the art. The processor 11 may be one of various processors, central processing units (CPU), microprocessor units (MPU), digital signal processors (DSP), or any other computing devices having the same function and known by those of ordinary skill in the art.

The facial expression simulation system 1 may be used in various virtual reality applications. When a user uses the facial expression simulation system 1 in a virtual reality application, the facial expression simulation system 1 will simulate the expression of a virtual facial model of the user in the virtual reality according to the practical sound and facial expression of the user. It shall be appreciated that the present invention does not limit the facial expression simulation system 1 to any specific implementation. For example, the facial expression simulation system 1 may be a host of the virtual reality application, may be integrated into a head-mounted display, and may be a cloud server or other devices having similar computing capabilities.

In this embodiment, the storage 13 stores seven three-dimensional facial models 102a, 102b, 102c, 102d, 102e, 102f, and 102g corresponding to seven preset sentiments (e.g., neutral, happy, angry, sad, scared, surprised, nauseated) one-to-one. It shall be appreciated that, in the present invention, the storage 13 needs to store at least two three-dimensional facial models (e.g., the three-dimensional facial models 102a and 102b corresponding to neutral sentiment and happy sentiment).

In this embodiment, the processor 11 identifies a present sentiment (not shown) according to an acoustic signal 120 of the user, wherein the present sentiment is one of the aforesaid seven preset sentiments. It shall be appreciated that the technology for identifying the sentiment from the acoustic signal 120 is well known to those of ordinary skill in the art and, thus, will not be further described herein. In some embodiments, the storage 13 may pre-store an acoustic sentiment determination model 104, and the processor 11 may retrieve a plurality of audio feature values from the acoustic signal 120 and identify that the audio feature values correspond to the present sentiment according to the acoustic sentiment determination model 104.

Please note that the way to obtain the acoustic signal 120 is not limited in the present invention. In this embodiment, the facial expression simulation system 1 may obtain the acoustic signal 120 via an externally connected acoustic sensor 17, the acoustic sensor 17 may sense the sound made by the user to generate the acoustic signal 120, and the facial expression simulation system 1 receives the acoustic signal 120 from the acoustic sensor 17 via a transceiving interface 15. For example, the acoustic sensor 17 may be a microphone, a microphone of a somatosensory machine, a microphone of an earphone, a microphone of a head-mounted display, or a sound sensing device having the same function and known by those of ordinary skill in the art. In some embodiments, an acoustic sensor 17 may be built in the facial expression simulation system 1, and the sound sensor 17 senses the sound made by the user to generate the acoustic signal 120.

Next, the processor 11 selects a selected model (not shown) from the seven three-dimensional facial models 102a, 102b, 102c, 102d, 102e, 102f, and 102g stored in the storage 13 according to the present sentiment, wherein the preset sentiment corresponding to the selected model is the same as the present sentiment. For example, if the present sentiment identified by the processor 11 according to the acoustic signal 120 is "happy," the processor 11 selects the three-dimensional facial model 102b (i.e., the three-dimensional facial model corresponding to "happy") from the storage 13 as the selected model.

Additionally, the processor 11 predicts an upper half face image (not shown) (e.g., an image of a part of the face that is covered by the head-mounted display) according to a lower half face image 122 of the user. In some embodiments, the storage 13 may store a deep learning model 106, and the processor 11 may predict the upper half face image from the lower half face image 122 by the deep learning model 106. Please note that the way to train the deep learning model 106 and the way to achieve prediction by the deep learning model 106 are already appreciated by those of ordinary skill in the art, and thus will not be further described herein. Thereafter, the processor 11 combines the lower half face image 122 and the upper half face image (not shown) to form a whole face image (not shown). For example, the processor 11 may use a feature point matching technology (but not limited thereto) to combine the lower half face image 122 and the upper half face image to form the whole face image.

It shall be appreciated that, in some situations, the head-mounted display will block some light rays so that the lower half face image 122 is somewhat distorted. In some embodiments, in order to overcome such a problem and obtain a better prediction, the processor 11 may first perform brightness compensation on the lower half face image 122, and then predict the upper half face image from the lower half face image 122 on which the brightness compensation has been performed. In some embodiments, the processor 11 may perform the brightness compensation on the whole face image that is obtained by combining the upper and lower half face images in order to make the subsequent matching (which will be detailed later) more accurate.

Please note that the way to obtain the lower half face image 122 is not limited in the present invention. In this embodiment, the facial expression simulation system 1 may obtain the lower half face image 122 via an externally connected infrared video camera 19, the infrared video camera 19 may scan the lower half of the face of the user to generate a two-dimensional image serving as the lower half face image 122 of the user, and the facial expression simulation system 1 receives the lower half face image 122 from the infrared video camera 19 via the transceiving interface 15 (or another transceiving interface). In some embodiments, an infrared video camera 19 may be built in the facial expression simulation system 1, and a two-dimensional image generated by scanning the lower half of the face of the user by the infrared video camera 19 is used as the lower half face image 122 of the user.

After obtaining the whole face image and the selected model, the processor 11 generates a plurality of feature relationships by matching a plurality of facial features of the whole face image with a plurality of facial features of the selected model. It shall be appreciated each of the facial features of the selected model is three-dimensional and each of the facial features of the whole face image is two-dimensional. In some embodiments, the processor 11 may transform the facial features of the selected model from three-dimensional to two-dimensional by a perspective projection and then generates the feature relationships by matching the facial features of the whole face image with the transformed facial features of the selected model. That is, the dimensionality of the selected model may be reduced from three-dimensional to two-dimensional through the perspective projection process.

After generating the feature relationships, a virtual facial model (not shown) may be adjusted for simulating facial expression according to the feature relationships. For example, the facial expression simulation system 1 may transmit the feature relationships to a virtual reality platform that executes the virtual reality application via a transmission interface, and the virtual reality platform changes the virtual facial model according to the feature relationships to simulate a facial expression vividly.

According to the above descriptions, the facial expression simulation system 1 identifies the present sentiment of the user according to the sound made by the user and then selects a three-dimensional facial model that is consistent with the present sentiment as a selected model to be used in the subsequent simulation. In this way, the facial expression of the selected model is consistent with the present sentiment of the user. Moreover, the facial expression simulation system 1 predicts the upper half face image according to the lower half face image 122 of the user and then combines the upper half face image and the lower half face image 122 to form a whole face image (e.g., via the feature point matching technology). Because the facial expression simulation system 1 adopts the present lower half face image 122 of the user to predict the upper half face image, the whole face image obtained by combining the upper and lower half face images may be regarded as the present whole face image of the user. In this way, the present whole face image presents more instant, specific, and fine expression changes. Therefore, the virtual facial model can simulate the facial expression of the user more accurately by finding out the feature relationships between the whole face image and the selected model and then changing the virtual facial model corresponding to the user accordingly. Consequently, the present invention can make a virtual facial model simulate facial expression vividly without equipping additional sensors when a part of user face is covered by the head-mounted display.

Figure 2:
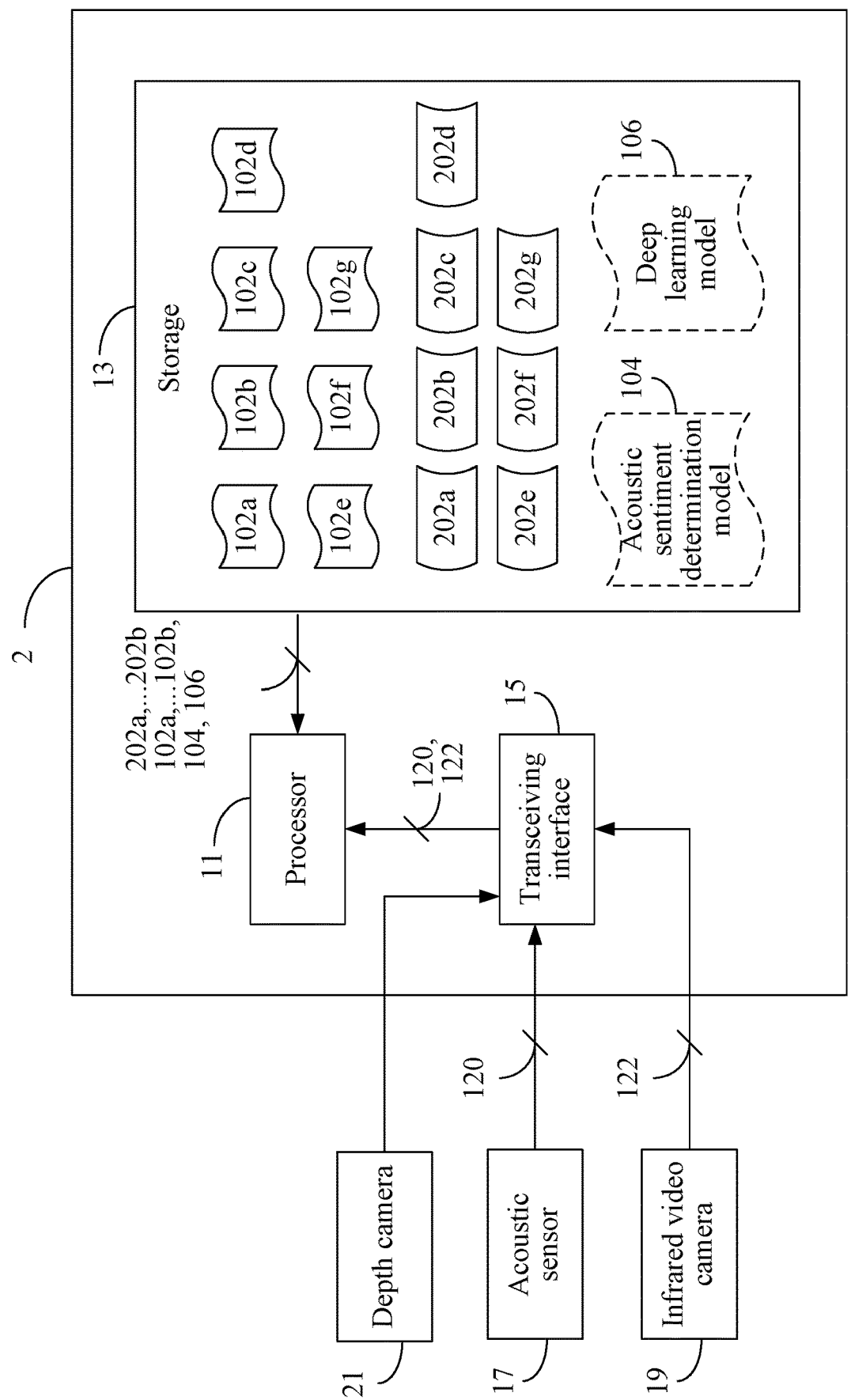
FIG. 2 is a schematic view depicting a system for simulating facial expression of a virtual facial model according to a second embodiment of the present invention.

A second embodiment of the present invention is a system for simulating facial expression of a virtual facial model (hereinafter referred to as "facial expression simulation system") 2, whose schematic view is depicted in FIG. 2. The facial expression simulation system 2 comprises a processor 11 and a storage 13. The facial expression simulation system 2 can execute all the operations that the facial expression simulation system 1 of the first embodiment can execute and, thus, has the function that the facial expression simulation system 1 has and can achieve the technical effect that the facial expression simulation system 1 can achieve. Comparing to the facial expression simulation system 1, the facial expression simulation system 2 further executes the construction procedures of various models. The following description will focus on the differences between the facial expression simulation system 2 and the facial expression simulation system 1.

In this embodiment, at the initial construction stage, the storage 13 stores seven three-dimensional standard templates 202*a*, 202*b*, 202*c*, 202*d*, 202*e*, 202*f*, and 202*g* corresponding to seven preset sentiments (e.g., neutral, happy, angry, sad, scared, surprised, nauseated) one-to-one. It shall be appreciated that the number of the three-dimensional standard templates stored in the storage 13 is not limited (in other words, the number of the preset sentiments is not limited) in the present invention, and the preset sentiments corresponding to the three-dimensional standard templates are not limited in the present invention. In this embodiment, the processor 11 generates the three-dimensional facial models 102*a*, 102*b*, 102*c*, 102*d*, 102*e*, 102*f*, and 102*g* for expression simulation according to the three-dimensional standard templates 202*a*, 202*b*, 202*c*, 202*d*, 202*e*, 202*f*, and 202*g*.

In this embodiment, the processor 11 first generates the three-dimensional facial model corresponding to one of the preset sentiments and then generate the three-dimensional facial models of the other preset sentiments. For convenience, it is assumed that the preset sentiment that the processor 11 first processes is the neutral sentiment (but it is not limited thereto).

Specifically, the facial expression simulation system 2 is externally connected with a depth camera 21. The depth camera 21 scans a first expression (i.e., an expression corresponding to the neutral sentiment) that is for the user to generate a plurality of first depth values, wherein each of the first depth values is a distance from the depth camera 21 to a position on a face of the user when the user made the first expression. The facial expression simulation system 2 receives the first depth values from the depth camera 21 via the transceiving interface 15 (or another transceiving interface). A first three-dimensional original model (not shown) that is going to be used by the facial expression simulation system 2 comprises the first depth values.

Next, the processor 11 generates a first three-dimensional facial model (i.e., the three-dimensional facial model 102*a* corresponding to the neutral sentiment) by mapping a first three-dimensional standard template (i.e., the three-dimensional standard template 202*a* corresponding to the neutral sentiment) among the three-dimensional standard templates 202*a*, 202*b*, 202*c*, 202*d*, 202*e*, 202*f* and 202*g* to the first three-dimensional original model. For example, the processor 11 may match the features between the first three-dimensional standard template (i.e., the three-dimensional standard template 202a) and the first three-dimensional original model (e.g., finding out the relationships between the features such as eyes, noses, mouths, etc.), and morph the mesh topology of the first three-dimensional standard template (i.e., the three-dimensional standard template 202a) according to the shape interpolation technology of a radial basis function so that the mesh topology of the first three-dimensional standard template is similar to the mesh topology of the first three-dimensional original model. Thereby, the first three-dimensional facial model (i.e., the three-dimensional facial model 102a corresponding to the neutral sentiment) is obtained.

Thereafter, the processor 11 generates the other three-dimensional facial models (i.e., the three-dimensional facial models 102b, 102c, 102d, 102e, 102f and 102g) according to a difference (e.g., coordinate differences of the mesh topologies) between the first three-dimensional facial model (i.e., the three-dimensional facial model 102a) and the first three-dimensional standard template (i.e., the three-dimensional standard template 202a), and a difference (e.g., coordinate differences of the mesh topologies) between the first three-dimensional standard template (i.e., the three-dimensional standard template 202a) and each of the other three-dimensional standard templates (i.e., the three-dimensional standard templates 202b, 202c, 202d, 202e, 202f and 202g).

In some embodiments, in order to achieve more accurate result, the depth camera 21 scans two expressions of the user, the processor 11 generates two three-dimensional facial models corresponding to two preset sentiments accordingly, and the processor 11 then generates the three-dimensional facial models of the other preset sentiments according to the two three-dimensional facial models. For convenience, it is assumed that the two preset sentiments that the processor 11 first processes are the neutral sentiment and the happy sentiment (but it is not limited thereto).

Specifically, in these embodiments, the depth camera 21 scans a first expression (i.e., an expression corresponding to the neutral sentiment) for the user to generate a plurality of first depth values, wherein each of the first depth values is a distance from the depth camera 21 to a first position on a face of the user when the user made the first expression. Moreover, the depth camera 21 scans a second expression (i.e., an expression corresponding to the happy sentiment) for the user to generate a plurality of second depth values, wherein each of the second depth values is a distance from the depth camera 21 to a second position on the face of the user when the user made the second expression. The facial expression simulation system 2 receives the first depth values and the second depth values from the depth camera 21 via the transceiving interface 15 (or another transceiving interface). A first three-dimensional original model (not shown) that is going to be used by the facial expression simulation system 2 comprises the first depth values, while a second three-dimensional original model (not shown) that is going to be used by the facial expression simulation system 2 comprises the second depth values.

Similarly, the processor 11 generates a first three-dimensional facial model (i.e., the three-dimensional facial model 102a corresponding to the neutral sentiment) by mapping a first three-dimensional standard template (i.e., the three-dimensional standard template 202a corresponding to the neutral sentiment) among the three-dimensional standard templates 202a, 202b, 202c, 202d, 202e, 202f, and 202g to a first three-dimensional original model, and generates a second three-dimensional facial model (i.e., the three-dimensional facial model 102b corresponding to the happy sentiment) by mapping a second three-dimensional standard template (i.e., the three-dimensional standard template 202b corresponding to the happy sentiment) among the three-dimensional standard templates 202a, 202b, 202c, 202d, 202e, 202f, and 202g to a second three-dimensional original model.

For example, the processor 11 may match the features between the first three-dimensional standard template (i.e., the three-dimensional standard template 202a) and the first three-dimensional original model (e.g., to find out relationships between features such as eyes, noses and mouths or the like), and then morph the mesh topology of the first three-dimensional standard template (i.e., the three-dimensional standard template 202a) according to the shape interpolation technology of a radial basis function so that the mesh topology of the first three-dimensional standard template is approximately similar to the mesh topology of the first three-dimensional original model. Thereby, the first three-dimensional facial model (i.e., the three-dimensional facial model 102a corresponding to the neutral sentiment) is obtained. Similarly, the processor 11 may match the features between the second three-dimensional standard template (i.e., the three-dimensional standard template 202b) and the second three-dimensional original model (e.g., to find out relationships between features such as eyes, noses and mouths or the like), and then morphs the mesh topology of the second three-dimensional standard template (i.e., the three-dimensional standard template 202b) according to the shape interpolation technology of a radial basis function so that the mesh topology of the second three-dimensional standard template is approximately similar to the mesh topology of the second three-dimensional original model. Thereby, the second three-dimensional facial model (i.e., the three-dimensional facial model 102b corresponding to the neutral sentiment) is obtained.

Thereafter, the processor 11 generates the other three-dimensional facial models (i.e., the three-dimensional facial models 102c, 102d, 102e, 102f, and 102g) according to a difference (e.g., coordinate differences of the mesh topologies) between the first three-dimensional facial model (the three-dimensional facial model 102a) and the first three-dimensional standard template (the three-dimensional standard template 202a), a difference (e.g., coordinate differences of the mesh topologies) between the second three-dimensional facial model (the three-dimensional facial model 102b) and the second three-dimensional standard template (the three-dimensional standard template 202b), and a difference (e.g., coordinate differences of the mesh topologies) between the first three-dimensional standard template (i.e., the three-dimensional standard template 202a) and each of the other three-dimensional standard templates (i.e., the three-dimensional standard templates 202c, 202d, 202e, 202f and 202g).

In some embodiments, the construction procedure executed by the facial expression simulation system 2 further comprises training a prediction model for identifying the upper half face image of the user, such as a deep learning model 106 or other models having the identifying function. The deep learning model 106 may be a Convolutional Neural Network (CNN) model, a Recurrent Neural Network (RNN), but it is not limited thereto. Taking the deep learning model 106 as an example, the processor 11 trains the deep learning model 106 by a plurality of whole face images. Specifically, the processor 11 finds out expression feature points of each of the whole face images, divides the expression feature points into expression feature points of the lower half face and expression feature points of the upper half face, takes the expression feature points of the lower half face of each of the whole face images as the input of a deep learning network (e.g., the Convolutional Neural Network or a Recurrent Neural Network) and trains the deep learning network into a model that is capable of finding out expression feature points of the corresponding upper half face as the deep learning model 106.

In some embodiments, the acoustic sentiment determination model 104 stored in the storage 13 may be a Thayer's emotion model, other known sentiment models, any sentiment models established by a user, or the like. In these embodiments, the acoustic sentiment determination model 104 comprises three stages of classifiers. The first stage has one classifier which is configured to perform arousal classification on the audio feature values of the acoustic signal 120. The second stage comprises two classifiers which are configured to perform valence classification on the classification result of the first stage. The third stage comprises four sentiment classifiers which are configured to perform sentiment identification on the classification result of the second stage to obtain the present sentiment of the user. In these embodiments, the construction procedure executed by the facial expression simulation system 2 further comprises training the acoustic sentiment determination model 104 for identifying the present sentiment from the acoustic signal 120. The way to train the Thayer's emotion model is well known by those of ordinary skill in the art and, thus, will not be described herein.

According to the above descriptions, the facial expression simulation system 2 provides a plurality of three-dimensional standard templates for constructing the three-dimensional facial models. During the construction procedure, the depth camera 21 scans one or more expressions for the user to generate the three-dimensional original models, and then the processor 11 generates the three-dimensional facial models (which will be used during the practical operation of the virtual reality application) according to various relationships between the three-dimensional standard templates and the three-dimensional original models. Because the three-dimensional original model(s) of the user is/are adopted during the construction procedure, the generated three-dimensional facial models will be more accurate. Thereby, the simulating effect of the virtual facial model can be more accurate.

Figure 3A:
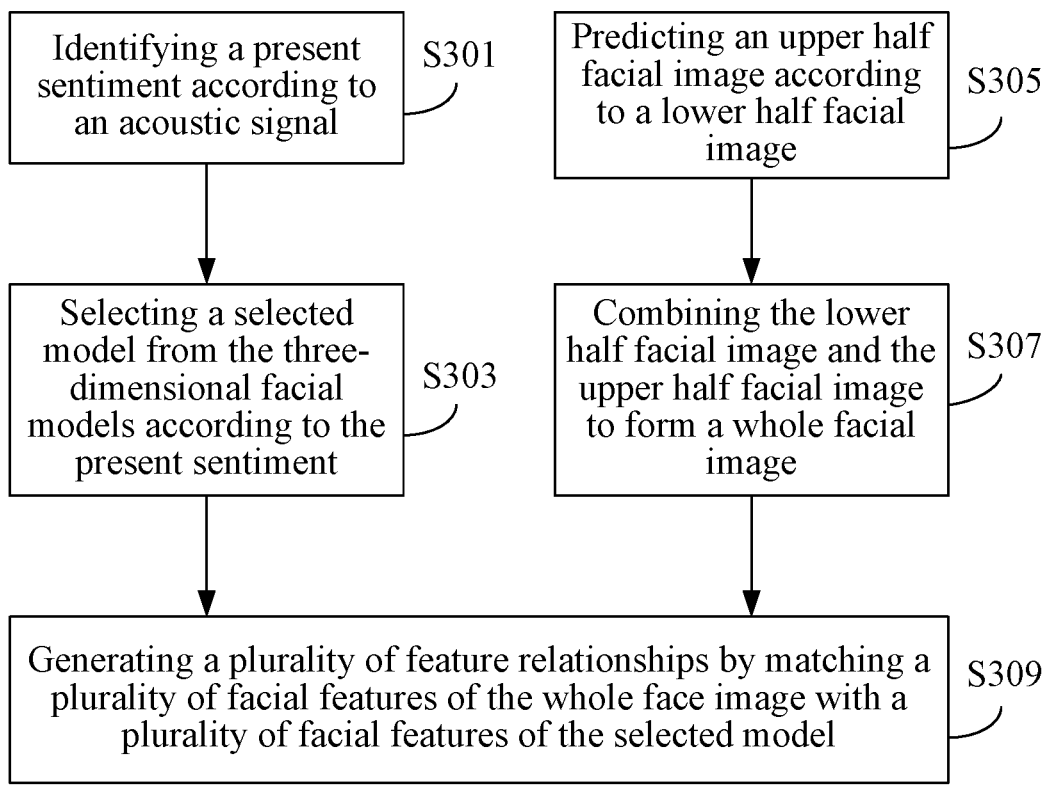
FIG. 3A is a flowchart depicting a method for simulating facial expression of a virtual facial model according to a third embodiment of the present invention.

A third embodiment of the present invention is a method for simulating facial expression of a virtual facial model (hereinafter referred to as "facial expression simulation method"), whose flowchart is depicted in FIG. 3A. The facial expression simulation method is adapted for use in an electronic computing device, e.g., the facial expression simulation system 1 or 2 in the aforesaid embodiments. The electronic computing device stores a plurality of three-dimensional facial models corresponding to a plurality of preset sentiments one-to-one. The facial expression simulation method comprises the following steps S301 to S309.

In step S301, the electronic computing device identifies a present sentiment according to an acoustic signal of a user. In some embodiments, the electronic computing device further stores an acoustic sentiment determination model and, thus, the step S301 may retrieve a plurality of audio feature values from the acoustic signal and identify that the audio feature values correspond to the present sentiment according to the acoustic sentiment determination model. Next, in step S303, the electronic computing device selects a selected model from the three-dimensional facial models according to the present sentiment, wherein the preset sentiment corresponding to the selected model is the same as the present sentiment.

Moreover, in step S305, the electronic computing device predicts an upper half face image according to a lower half face image of the user. In some embodiments, the step S305 predicts the upper half face image from the lower half face image by a deep learning model. In some embodiments, in order to obtain a better prediction result, the facial expression simulation method may execute another step for perform brightness compensation on the lower half face image before the step S305, and the step S305 then predicts the upper half face image according to the lower half face image on which the brightness compensation has been performed.

It shall be appreciated that the way that the facial expression simulation method obtains the lower half face image of the user is not limited in the present invention. In some embodiments, before the step S305, the facial expression simulation method may execute another step to scan the lower half face of the user by an infrared video camera to generate a two-dimensional image, wherein the two-dimensional image serves as the lower half face image of the user. In some embodiments, before the step S305, the facial expression simulation method executes another step to receive the lower half face image by the electronic computing device from an externally connected infrared video camera.

After the step S305, the electronic computing device executes step S307 to combine the lower half face image and the upper half face image to form a whole face image (e.g., via the feature point matching technology). In some embodiments, after the step S307, the facial expression simulation method may further execute a step to perform brightness compensation on the whole face image by the electronic computing device.

It shall be appreciated that in this embodiment, the facial expression simulation method executes the aforesaid steps related to sound (including the steps S301 and S303) and the aforesaid steps related to images (including the steps S305 and S307) in parallel as shown in FIG. 3. However, in some embodiments, the facial expression simulation method may first execute the aforesaid steps related to sound (including the steps S301 and S303) and then execute the aforesaid steps related to images (including the steps S305 and S307). In some embodiments, the facial expression simulation method may first execute the aforesaid steps related to images (including the steps S305 and S307) and then execute the aforesaid steps related to sound (including the steps S301 and S303).

After obtaining the whole face image and the selected model, the step S309 is executed by the electronic computing device for generating a plurality of feature relationships by matching a plurality of facial features of the whole face image with a plurality of facial features of the selected model. It shall be appreciated that each of the facial features of the selected model is three-dimensional, while each of the facial features of the whole face image is two-dimensional. Thus, in some embodiments, the step S309 transforms the facial features of the selected model from three-dimensional to two-dimensional by a perspective projection and then generates the feature relationships by matching the facial features of the whole face image with the transformed facial features of the selected model. After generating the feature relationships, a virtual facial model of the user in the virtual reality can change according to the feature relationships and thereby simulate the expression of the user.

Figure 3B:
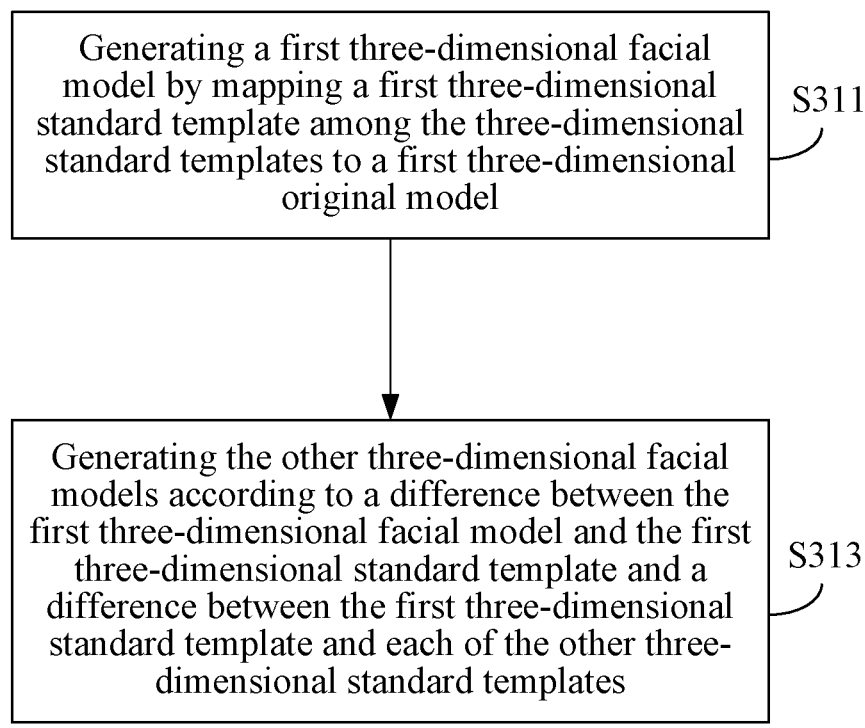
FIG. 3B is a flowchart depicting a model construction procedure executed by some embodiments of the present invention.

In some embodiments, the facial expression simulation method may further execute a construction procedure as shown in FIG. 3B before executing the steps S301 to S309. In these embodiments, the electronic computing device further stores a plurality of three-dimensional standard templates corresponding to a plurality of preset sentiments one-to-one. The constructing process comprises step S311 to S313.

In the step S311, the electronic computing device generates a first three-dimensional facial model by mapping a first three-dimensional standard template among the three-dimensional standard templates to a first three-dimensional original model. In the step S313, the electronic computing device generates the other three-dimensional facial models according to a difference between the first three-dimensional facial model and the first three-dimensional standard template and a difference between the first three-dimensional standard template and each of the other three-dimensional standard templates.

It shall be appreciated that, in some embodiments, the facial expression simulation method may execute another step before the step S311 to generate a plurality of first depth values by a depth camera by scanning a first expression for a user and then form the first three-dimensional original model according to the first depth values. Each of the aforesaid first depth values is a distance from the depth camera to a position on a face of the user when the user made the first expression.

Figure 3C:
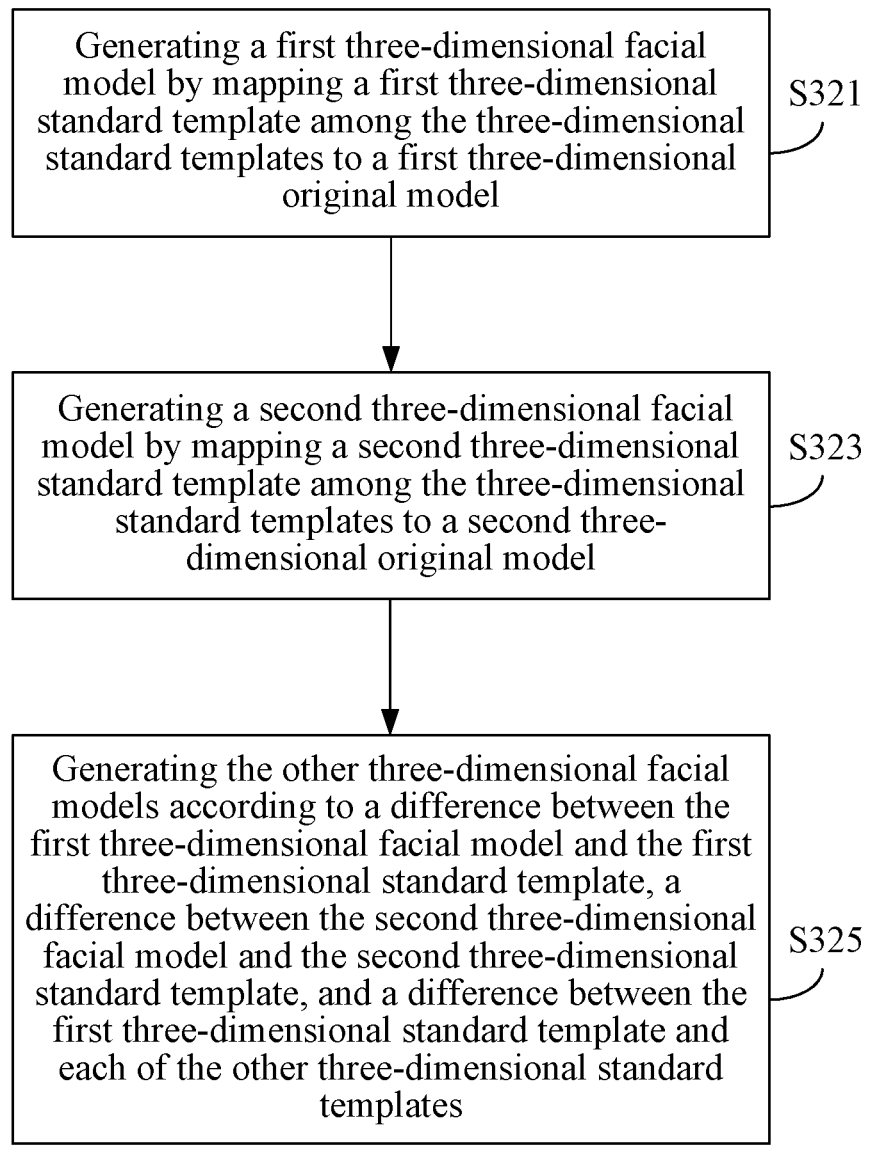
FIG. 3C is a flowchart depicting a model construction procedure executed by some embodiments of the present invention.

In some embodiments, the facial expression simulation method may execute the construction procedure as shown in FIG. 3C instead in order to achieve a more accurate effect. The construction procedure comprises steps S321 to S325.

In the step S321, the electronic computing device generates a first three-dimensional facial model by mapping a first three-dimensional standard template among the three-dimensional standard templates to a first three-dimensional original model. In the step S323, the electronic computing device generate a second three-dimensional facial model by mapping a second three-dimensional standard template among the three-dimensional standard templates to a second three-dimensional original model. In the step S325, the electronic computing device generates the other three-dimensional facial models according to a difference between the first three-dimensional facial model and the first three-dimensional standard template, a difference between the second three-dimensional facial model and the second three-dimensional standard template, and a difference between the first three-dimensional standard template and each of the other three-dimensional standard templates.

Similarly, in some embodiments, before the step S321, the facial expression simulation method may execute another step to generate a plurality of first depth values by a depth camera by scanning a first expression for a user and then form the first three-dimensional original model according to the first depth values. Before the step S321, the facial expression simulation method may further execute another step to generate a plurality of second depth values by the depth camera by scanning a second expression for the user and then form the second three-dimensional original model according to the second depth values. It shall be appreciated that each of the first depth values is a distance from the depth camera to a facial position when the user made the first expression, while each of the second depth values is a distance from the depth camera to a facial position when the user made the second expression.

In addition to the aforesaid steps, the third embodiment can execute all the operations and steps set forth in the first and the second embodiments, have the same functions and deliver the same technical effects as the first and the second embodiments. How the third embodiment executes these operations and steps, has the same functions, and delivers the same technical effects as the first and the second embodiments will be readily appreciated by those of ordinary skill in the art based on the explanation of the first and second embodiments, and thus will not be further described herein.

According to the above descriptions, when being used in a virtual reality application, the facial expression simulation technology (at least including a system and method for simulating facial expression of a virtual facial model) provided by the present invention identifies a present sentiment of a user according to a sound made by the user and then selects a three-dimensional facial model that is consistent with the present sentiment as a selected model to be adopted subsequently. In this way, the selected model has the expression that is consistent with the present sentiment of the user. Moreover, the facial expression simulation technology provided by the present invention predicts an upper half face image according to a lower half face image of the user and combines the lower half face image and the upper half face image to form a whole face image and thereby obtaining a more accurate and realistic whole face image. Because the selected model and the whole face image are respectively generated based on the present sound and the lower half face image of the user, the virtual facial model can simulate the expression of the user more accurately by finding out feature relationships between the whole face image and the selected model and then changing the virtual facial model corresponding to the user according to the feature relationships. In this way, a more realistic effect is achieved. Consequently, the present invention can make a virtual facial model simulate facial expression vividly without equipping additional sensors when a part of user face is covered by the head-mounted display.

Additionally, the facial expression simulation technology provided by the present invention may further comprise the construction procedure of the three-dimensional facial models, which constructs the three-dimensional facial models based on one or more expressions for the user. Therefore, more accurate three-dimensional facial models can be generated, which makes the simulating effect of the virtual facial model more accurate and more realistic.

The above disclosure is only utilized to enumerate partial embodiments of the present invention and illustrated technical features thereof, but not to limit the scope of the present invention. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A system for simulating facial expression of a virtual facial model, comprising:
   a storage, being configured to store a plurality of three-dimensional facial models corresponding to a plurality of preset sentiments one-to-one; and
   a processor, being electrically connected to the storage and configured to identify a present sentiment according to an acoustic signal and select a selected model from the three-dimensional facial models according to the present sentiment, wherein the preset sentiment corresponding to the selected model is the same as the present sentiment;
   wherein the processor predicts an upper half face image according to a lower half face image, combines the lower half face image and the upper half face image to form a whole face image, and generates a plurality of feature relationships by matching a plurality of facial features of the whole face image with a plurality of facial features of the selected model so that the virtual facial model is adjusted for simulating facial expression according to the feature relationships.

2. The system of claim 1, wherein the storage further stores a plurality of three-dimensional standard templates corresponding to the preset sentiments one-to-one and the processor generates the three-dimensional facial models by the following operations: (i) generating a first three-dimensional facial model among the three-dimensional facial models by mapping a first three-dimensional standard template among the three-dimensional standard templates to a first three-dimensional original model and (ii) generating the other three-dimensional facial models among the three-dimensional facial models according to a difference between the first three-dimensional facial model and the first three-dimensional standard template and a difference between the first three-dimensional standard template, among the three-dimensional standard templates, and each of the other three-dimensional standard templates.

3. The system of claim 2, wherein the first three-dimensional original model comprises a plurality of first depth values generated by a depth camera by scanning a first expression for a user, and each of the first depth values is a distance from the depth camera to a position on a face of the user when the user made the first expression.

4. The system of claim 1, wherein the storage further stores a plurality of three-dimensional standard templates corresponding to the preset sentiments one-to-one and the processor generates the three-dimensional facial models by the following operations: (i) generating a first three-dimensional facial model among the three-dimensional facial models by mapping a first three-dimensional standard template among the three-dimensional standard templates to a first three-dimensional original model, (ii) generating a second three-dimensional facial model among the three-dimensional facial models by mapping a second three-dimensional standard template among the three-dimensional standard templates to a second three-dimensional original model, and (iii) generating the other three-dimensional facial models among the three-dimensional facial models according to a difference between the first three-dimensional facial model and the first three-dimensional standard template, a difference between the second three-dimensional facial model and the second three-dimensional standard template, and a difference between the first three-dimensional standard template among the three-dimensional standard templates and each of the other three-dimensional standard templates.

5. The system of claim 4, wherein the first three-dimensional original model comprises a plurality of first depth values generated by a depth camera by scanning a first expression for a user, each of the first depth values is a distance from the depth camera to a first position on a face of the user when the user made the first expression, the second three-dimensional original model comprises a plurality of second depth values generated by the depth camera by scanning a second expression for the user, and each of the second depth values is a distance from the depth camera to a second position on the face when the user made the second expression.

6. The system of claim 1, wherein the lower half face image is a two-dimensional image generated by an infrared video camera by scanning a lower half of a face of a user.

7. The system of claim 1, wherein the processor predicts the upper half face image by a deep learning model.

8. The system of claim 1, wherein the processor further performs brightness compensation on the whole face image.

9. The system of claim 1, wherein each of the facial features of the selected model is three-dimensional, each of the facial features of the whole face image is two-dimensional, and the processor transforms the facial features of the selected model from three-dimensional to two-dimensional by a perspective projection and then generates the feature relationships by matching the facial features of the whole face image with the transformed facial features of the selected model.

10. The system of claim 1, wherein the storage further stores an acoustic sentiment determination model, the processor further retrieves a plurality of audio feature values from the acoustic signal, and the processor further identifies that the audio feature values correspond to the present sentiment according to the acoustic sentiment determination model.

11. A method for simulating facial expression of a virtual facial model, the method being used in an electronic computing device, the electronic computing device storing a plurality of three-dimensional facial models corresponding to a plurality of preset sentiments one-to-one, the method comprising:
(a) identifying a present sentiment according to an acoustic signal;
(b) selecting a selected model from the three-dimensional facial models according to the present sentiment, wherein the preset sentiment corresponding to the selected model is the same as the present sentiment;
(c) predicting an upper half face image according to a lower half face image;
(d) combining the lower half face image and the upper half face image to form a whole face image; and
(e) generating a plurality of feature relationships by matching a plurality of facial features of the whole face image with a plurality of facial features of the selected model so that the virtual facial model is adjusted for simulating facial expression according to the feature relationships.

12. The method of claim 11, wherein the electronic computing device further stores a plurality of three-dimensional standard templates corresponding to the preset sentiments one-to-one and the method further comprises:
generating a first three-dimensional facial model among the three-dimensional facial models by mapping a first three-dimensional standard template among the three-dimensional standard templates to a first three-dimensional original model; and
generating the other three-dimensional facial models among the three-dimensional facial models according to a difference between the first three-dimensional facial model and the first three-dimensional standard template and a difference between the first three-dimensional standard template among the three-dimensional standard templates and each of the other three-dimensional standard templates.

13. The method of claim 12, further comprising:
generating a plurality of first depth values by a depth camera by scanning a first expression for a user, wherein each of the first depth values is a distance from the depth camera to a position on a face of the user when the user made the first expression;
wherein the first three-dimensional original model comprises the first depth values.

14. The method of claim 11, wherein the electronic computing device further stores a plurality of three-dimensional standard templates corresponding to the preset sentiments one-to-one and the method further comprises:

generating a first three-dimensional facial model among the three-dimensional facial models by mapping a first three-dimensional standard template among the three-dimensional standard templates to a first three-dimensional original model;

generating a second three-dimensional facial model among the three-dimensional facial models by mapping a second three-dimensional standard template among the three-dimensional standard templates to a second three-dimensional original model; and generating the other three-dimensional facial models among the three-dimensional facial models according to a difference between the first three-dimensional facial model and the first three-dimensional standard template, a difference between the second three-dimensional facial model and the second three-dimensional standard template, and a difference between the first three-dimensional standard template among the three-dimensional standard templates and each of the other three-dimensional standard templates.

15. The method of claim 14, further comprising:

generating a plurality of first depth values by a depth camera by scanning a first expression for a user, wherein each of the first depth values is a distance from the depth camera to a first position on a face of the user when the user made the first expression; and generating a plurality of second depth values by the depth camera by scanning a second expression for the user, wherein each of the second depth values is a distance from the depth camera to a second position on the face when the user made the second expression;

wherein the first three-dimensional original model comprises the first depth values, and the second three-dimensional original model comprises the second depth values.

16. The method of claim 11, further comprising:

generating the lower half face image by an infrared video camera by scanning a lower half of a face of a user, wherein the lower half face image is a two-dimensional image.

17. The method of claim 11, wherein the step (c) predicts the upper half face image by a deep learning model.

18. The method of claim 11, further comprising:

performing brightness compensation on the whole face image.

19. The method of claim 11, wherein each of the facial features of the selected model is three-dimensional, each of the facial features of the whole face image is two-dimensional, and the step (e) transforms the facial features of the selected model from three-dimensional to two-dimensional by a perspective projection and then generates the feature relationships by matching the facial features of the whole face image with the transformed facial features of the selected model.

20. The method of claim 11, wherein the electronic computing device further stores an acoustic sentiment determination model and the step (a) comprises:

retrieving a plurality of audio feature values from the acoustic signal; and identifying that the audio feature values correspond to the present sentiment according to the acoustic sentiment determination model.

* * * * *